Patented Sept. 5, 1933

1,925,441

UNITED STATES PATENT OFFICE 1,925,441

FOOD PRODUCT AND METHOD OF MAKING THE SAME

James A. Finley, Claremont, and Clarence P. Wilson, Pomona, Calif., assignors to California Fruit Growers Exchange, Los Angeles, Calif., a corporation of California No Drawing. Application January 27, 1927
Serial No. 164,122

10 Claims. (Cl. 99—11)

Our said invention relates to a new food product, and it is an object thereof to provide such a product which shall be nourishing and refreshing and which shall have good keeping qualities.

Milk and fruit juices are known to be very healthy foods and during the past few years it has been recognized that contrary to popular belief they can be mixed to produce a very fine beverage food.

When fresh milk is used in the commercial sale of such a beverage food many difficulties arise due to the irregular character of the demand with consequent shortage of supplies at rush periods and the likelihood if not the certainty of loss from spoilage when the anticipated trade does not materialize. We have found that instead of fresh milk, dried milk, either from whole milk or skim milk, or malted milk or condensed milk or any other wholesome milk regardless of its form can be mixed with fruit juice to make an excellent beverage.

Further, we have found that orange juice, lemon juice, grapefruit juice and other fruit juices can be dried or concentrated to a heavy syrup with or without the addition of sugar and such fruit juice product can be used for mixing with any of the various forms of milk mentioned above and the mixture when diluted to proper strength and flavor with water makes an excellent beverage.

Further, we have found that by incorporating a small amount of a suitable colloid, from ⅛ of 1% to 2%, depending on the quality of the colloid preparation used, the beverage acquires a smoothness and pleasing quality not obtained without the addition of the colloid. When such a colloid is properly used the drink can be mixed in a shorter time and has a creaminess or fluffiness that makes the drink very attractive and is not otherwise obtainable. As examples of such colloids we might use pectin, gelatine, agar, gum tragacanth, gum arabic, etc. The colloid may be added either as a solid or as a solution. We prefer to use pectin because it is a natural ingredient of oranges, lemons and grapefruit and of nearly all fruits while the other colloids are derived from other sources.

We have found that satisfactory results can be obtained in various ways.

For instance, a product consisting of orange juice, pectin and sugar may be dried to a powder and this may be dissolved in milk or milk and water to give a beverage that contains all the essential ingredients of a mixture of orange juice and milk and the pectin is efficacious in giving the pleasing quality of smoothness, creaminess and fine flavor to the finished beverage.

Or using orange juice or a concentrated orange juice preparation we can mix pectin with dry powdered milk in the proportion of about one part of pectin to 9 parts of powdered milk and add the mixture to the orange juice preparation. On thorough mixing we again have a new and delightful beverage.

Or we will mix a fruit juice such as orange juice or a mixture of orange juice and lemon juice with milk, dissolve sufficient sugar (cane sugar, glucose, maltose, dextrose or any desired sugar) to give to the mixture the desired taste, dissolve the proper amount of pectin in the fruit juice, milk and sugar and dry the entire mixture in a spray drier or by other suitable means. The powder thus resulting is stable and can be dissolved in water to make a ready-to-drink beverage as needed.

As another and specific example of the use of this invention we may put one ounce of concentrated orange juice and five ounces of water in a glass. We prepare a mixture of nine parts dried whole milk and one part powdered pectin and put one heaping teaspoonful of this mixture in a glass of the orangeade as above prepared. This mixture is then stirred in a regular mixing machine such as is used at soda fountains and the beverage is ready to drink.

The drink may be varied as to the proportions of orange juice, lemon juice or other fruit juice or several juices may be blended in the same drink. Also the proportion of pectin or other colloid to the milk powder may be varied and the relative proportions of the fruit juice and milk ingredients may be varied according to the fancy or needs of the user, all these variations coming clearly within the scope of the invention. In speaking of milk we mean any wholesome form of milk either whole milk or skim milk, such as fresh, condensed, dried or malted milk. Buttermilk, soured milk properly prepared, kumiss, etc., also are within the scope of this invention.

Further, since it is customary to vary the sweetness and density of a beverage to suit the individual taste, it will be understood that to any and all of the various mixtures which are claimed, sugar or water or both may be added to give the desired sweetness and concentration or dilution of the finished beverage.

The invention herein consists essentially in the use of pectin in a beverage, that is, a mixture of the essential constitutents of milk and fruit juice in order to give the finished drink smoothness, creaminess and full body and flavor and to insure a more homogeneous mixture of the fruit juice solids and milk solids so as to give a beverage of uniform consistency throughout which consistency is maintained for a relatively long period and which keeps the fruit juice solids and the very fine milk curd uniformly suspended and distributed throughout the beverage.

While we have described certain forms of our new food product such as seem especially desirable, yet it will be obvious to those skilled in the art that many changes may be made therein all without departing from the spirit of the invention, e. g., changes in proportions, ingredients, method of preparation, etc., therefore we do not limit ourselves to the particulars of the same as set forth in the above specification, but only as indicated in the appended claims.

Having fully described our said invention what we claim as new and desire to secure by Letters Patent is:

1. A method of producing a food product which comprises mixing a natural fruit juice, milk and pectin to make a solution and then reducing the mixture to a dry product.

2. A method of producing a beverage of fruit juice and milk which includes the step of adding a small quantity of pectin to the other ingredients, whereby the curdled milk remains in suspension as a very fine curd.

3. A method of producing a beverage which includes the steps of mixing a dry milk product and pectin and adding the same to a liquid medium containing fruit juice as an essential ingredient thereof and stirring the mixture.

4. A food product comprising a dried mixture of solids of fruit juice, milk and an edible colloid.

5. A food product comprising a dried mixture of solids of fruit juice, milk and pectin.

6. A food product comprising a mixture of dry pectin with dried solids of citrus fruit juice and milk and pectin.

7. A food product in beverage form comprising milk, fruit juice and an edible colloid, the curds formed by reaction of the fruit acid with the milk being held in suspension as fine particles.

8. A beverage containing as essential ingredients thereof milk, fruit juice and a comparatively small percentage of pectin, the pectin serving to maintain the curds in suspension in finely divided form.

9. A beverage containing as essential ingredients thereof milk, citrus fruit juice and a comparatively small percentage of pectin, in which the curdled milk remains in suspension as a very fine curd.

10. A beverage containing as essential ingredients thereof a citrus fruit juice composition, a redissolved dry milk product and pectin, in which the pectin acts to maintain the curdled milk in suspension as a very fine curd.

JAMES A. FINLEY.
CLARENCE P. WILSON.